(12) United States Patent
Balfe et al.

(10) Patent No.: US 9,701,544 B2
(45) Date of Patent: Jul. 11, 2017

(54) METHOD FOR CALCINATION OF A CARBON DIOXIDE RICH SORBENT

(71) Applicant: General Electric Technology GmbH, Baden (CH)

(72) Inventors: Michael Charles Balfe, Mainz (DE); Gerhard Heinz, Esslingen (DE); Olaf Stallmann, Essenheim (DE); Christoph Weingärtner, Gau-Algesheim (DE)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/400,156

(22) Filed: Jan. 6, 2017

(65) Prior Publication Data

US 2017/0113944 A1    Apr. 27, 2017

Related U.S. Application Data

(62) Division of application No. 14/742,102, filed on Jun. 17, 2015, now Pat. No. 9,573,848.

(30) Foreign Application Priority Data

Jun. 24, 2014    (EP) .................... 14173579

(51) Int. Cl.
| | | |
|---|---|---|
| C01F 11/06 | (2006.01) | |
| C01B 31/20 | (2006.01) | |
| C04B 7/44 | (2006.01) | |
| B01J 6/00 | (2006.01) | |
| F27B 7/02 | (2006.01) | |
| F27B 7/20 | (2006.01) | |
| F27D 17/00 | (2006.01) | |

(52) U.S. Cl.
CPC .............. *C01F 11/06* (2013.01); *B01J 6/002* (2013.01); *C01B 31/20* (2013.01); *C04B 7/44* (2013.01); *F27B 7/02* (2013.01); *F27B 7/2016* (2013.01); *F27D 17/004* (2013.01); *F27D 17/008* (2013.01); *F27B 2007/025* (2013.01)

(58) Field of Classification Search
CPC ............ C01F 11/06; B01J 6/002; C01B 31/20
USPC ........................................................ 502/56
See application file for complete search history.

(56) References Cited

U.S. PATENT DOCUMENTS

| | | |
|---|---|---|
| 4,118,309 A | 10/1978 | Myers et al. |
| 5,478,234 A | 12/1995 | Yokota et al. |

FOREIGN PATENT DOCUMENTS

| | | |
|---|---|---|
| EP | 0148090 A2 | 7/1985 |
| WO | 94/01203 A1 | 1/1994 |
| WO | 2009/105419 A2 | 8/2009 |
| WO | 2012/152899 A1 | 11/2012 |

*Primary Examiner* — Edward Johnson
(74) *Attorney, Agent, or Firm* — GE Global Patent Operation; Cynthia W. Flanigan

(57) ABSTRACT

A method for calcination includes providing a heated coarse solid particle stream with a carbon dioxide rich sorbent to a reactor having a rotatable container.

17 Claims, 3 Drawing Sheets

METHOD FOR CALCINATION OF A CARBON DIOXIDE RICH SORBENT

CROSS-REFERENCE TO RELATED APPLICATIONS

This application claims priority to and is a Divisional of U.S. application Ser. No. 14/742,102, filed Jun. 17, 2015, which in turn claims priority to European application 14173579.5 filed Jun. 24, 2014, the contents of both of which are hereby incorporated in their entirety.

TECHNICAL FIELD

The present invention relates to a calciner and a method for calcination of a carbon dioxide rich sorbent.

The calciner and the method according to this invention can be used in a cement production plant (for production of clinker) or for rich sorbent calcination produced from $CO_2$ capture from the flue gas of other industrial or power generation processes.

BACKGROUND

WO 94/01203 discloses a system with a furnace that supplies flue gas to a first fluidized bed and then to a boiler. From the boiler the flue gas is supplied to a carbonator. The first fluidized bed includes solid particles that are heated by the flue gas and circulate between the first fluidized bed and a fluidized bed calciner, for heating the fluidized bed calciner. At the fluidized bed calciner a sorbent used in a fluidized bed carbonator is regenerated. At the fluidized bed carbonator $CO_2$ from flue gas generated in the furnace is adsorbed.

In this system at the fluidized bed calciner a large amount of $CO_2$ is required for fluidization; this $CO_2$ must be first cooled before passing a fan and then reheated, these steps are associated with costs for the equipment and increased energy consumption. In addition the transfer of sorbent to the furnace would be associated with a sever loss of specific sorbent surface resulting in sorbent deactivation.

WO 2012/152899 discloses a system for the calcination of raw material for cement production; the system has a fluidized bed in which a fuel is combusted in presence of solid particles. From the fluidized bed the solid particles are separated from the flue gas and are sent to a calciner. Raw meal and $CO_2$ are supplied at the bottom of the calciner and rise through the calciner, and the solid particles are supplied at the top of the calciner and fall by gravity through the calciner in counter flow to the rising raw meal and $CO_2$; the solid particles transfer heat and calcine the raw meal.

Also, this system is conceived for the calcination of fresh limestone (having a higher $CO_2$ content than recarbonated sorbent), application of this system to spent sorbent (having a reduced $CO_2$ content) would require additional fluidization gas ($CO_2$) for compensation resulting in increasing equipment and operating costs. In addition, the specific pressure drop over such a counter current solids flow bed is characteristically high and the partial pressure of $CO_2$ (which is typically high at the bottom of this bed) strongly increases the required temperature to effect calcination. As such, the calcination of the rising particles is late and the cooling of the larger solid particles impeded; the sorbent temperature at the bottom of the bed increases forcing an increase in the exit temperature of the solids. The required heat flux for calcination combined with the limited cooling of the solid particles at the bottom of the bed implies the circulation of an unnecessarily large amount of solids particles.

WO 2009/105419 discloses a system for reducing carbon dioxide emissions from gas generated in burning fossil fuel. The system has a combustion vessel in which a fuel is combusted. The vessel contains inert solid particles that are heated during the combustion and sorbent particles that adsorb carbon dioxide generated during the combustion. The solid particles are transferred by falling through the combustion vessel to a calcination device and the sorbent particles rich in carbon dioxide are also supplied to the calcination device by entrainment from the combustion device and subsequent separation and transport. In the calcination device, the inert solid particles and the sorbent particles rich in carbon dioxide behave like a moving bed, causing heat transfer from the solid particles to the sorbent particles, causing carbon dioxide release from the sorbent particles. Carbon dioxide is then discharged from the calcination device and the inert solid particles and sorbent particles are allowed to fall into a second moving bed area where they are cooled for recirculation to the combustion vessel.

Also in this system, at the calcination device where inert solid particles and sorbent particles exchange heat in a moving bed and where calcination takes place and $CO_2$ is produced, an increase in the local calcination temperature can be expected due to back pressure caused by $CO_2$ bubble formation and the movement of the released $CO_2$ through the bulk, acting to reduce the temperature driving force at the bottom of the bed.

Also inefficiencies associated with mal distribution of inert sorbent particles and sorbent particles entering the calcination device lead to inefficiencies in heat transfer inside the moving bed, ultimately impeding heat transfer from the inert solid particles, limiting the cooling and the final temperature achieved of the inert solids and further the specific fraction of heat which can be extracted from a given mass of circulating inert solid particles.

Also sorbent particle entrainment in falling clusters of larger inert solids which fall to the lower section of the combustion device would intensify sorbent deactivation at the increased local temperatures and require compensation through additional make-up material or an increased solids circulation rate.

SUMMARY

An aspect of the invention includes providing a calciner and a method that does not require or only require limited fluidization gas and avoids or limit high operating pressures (or high pressure differentials) promoting low calcination temperature and optimal heat transfer driving forces.

Another aspect includes providing a calciner which mixes well hot inert solids with rich sorbent to drive calcination and achieve a homogeneous outlet temperature. The proposed calciner provides heat exchange between hot inert heat transfer solid particles (HT solids) and rich sorbent without sacrificing $CO_2$ purity or increasing the operational pressure (calcination temperature).

Another aspect includes providing a calciner which provides associated benefits in operational flexibility, such as adjustment in calcination time possibly required for the first calcination of natural materials, or to account for the variation in $CO_2$ capacity between different sorbent materials.

These and further aspects are attained by providing a calciner and a method in accordance with the accompanying claims.

BRIEF DESCRIPTION OF THE DRAWINGS

Further characteristics and advantages will be more apparent from the description of a preferred but non-exclusive embodiment of the calciner and method, illustrated by way of non-limiting example in the accompanying drawings, in which.

DETAILED DESCRIPTION

Figure 1:
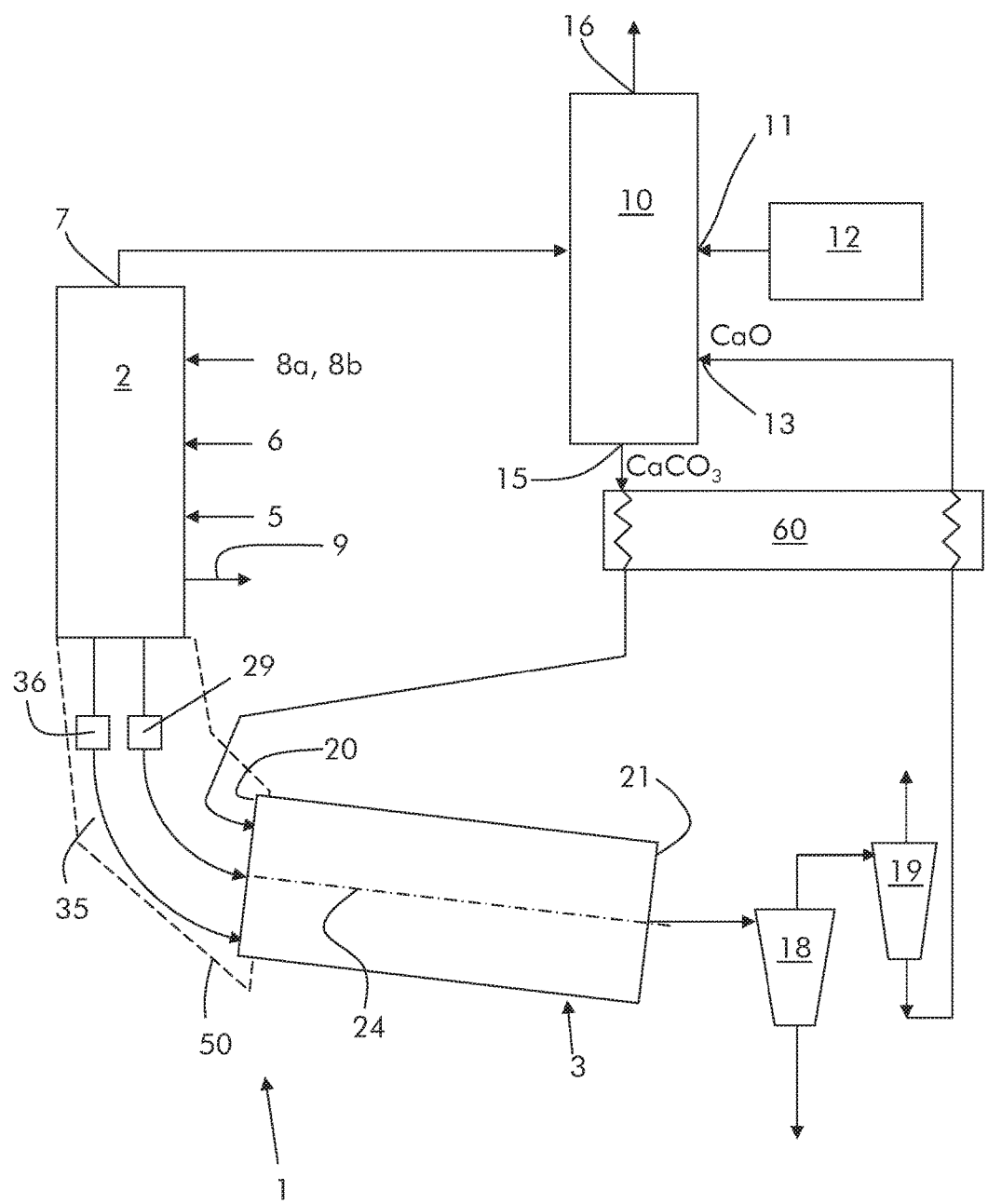
FIG. 1 shows a scheme of a carbonator-calciner system using a calciner according to the invention.
Figures 2, 3:
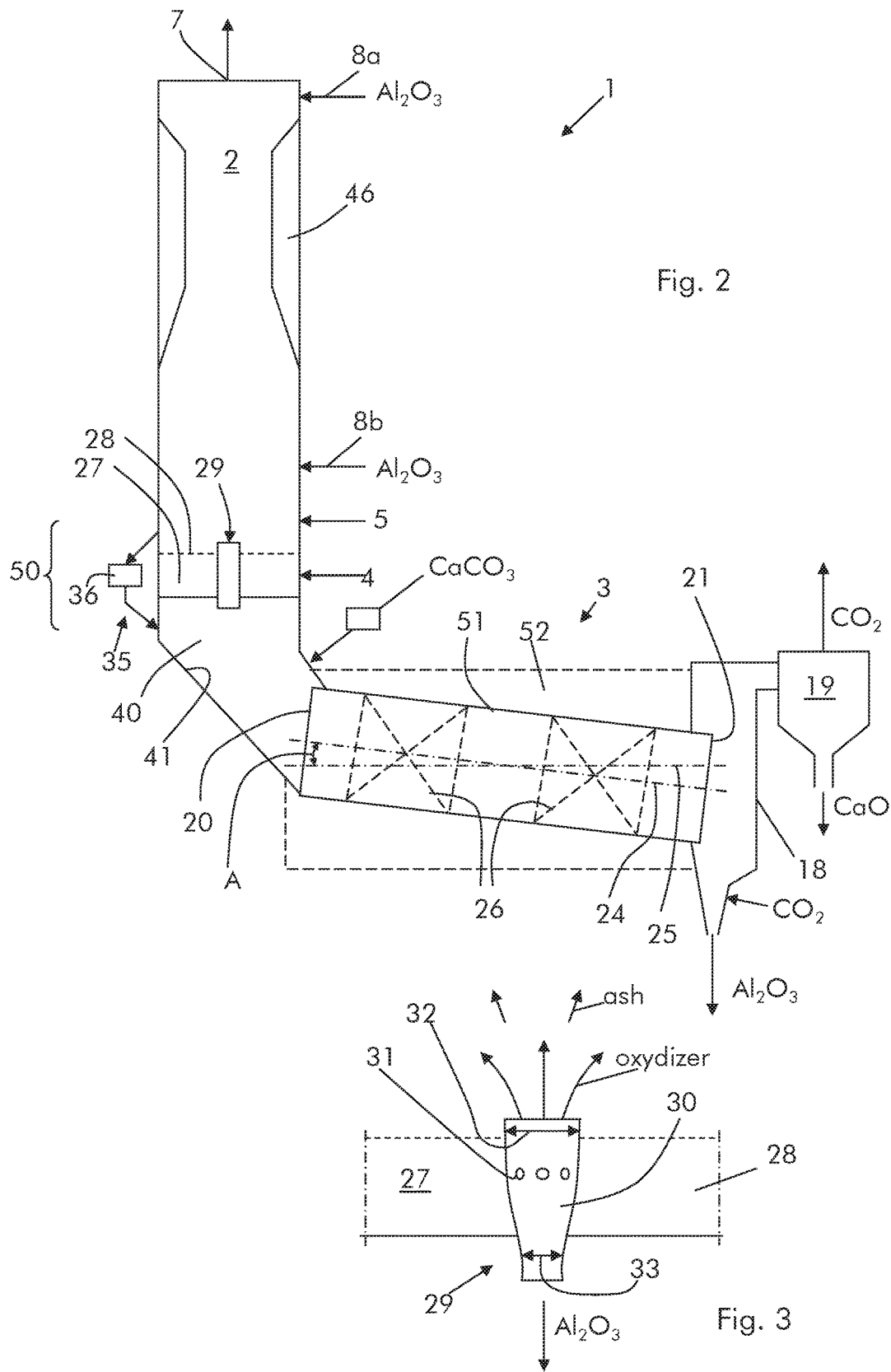
FIG. 2 shows a calciner according to the invention.
FIG. 3 shows a particular embodiment of a solids classifier.

With reference to the figures, these show a carbonator-calciner system including a calciner 1 having a furnace 2 and a reactor 3 in which the calcination takes place.

The furnace 2 has an oxidizer supply 5, a fuel supply 6, a flue gas discharge 7 and a solid particles (HT solids) supply 8a, 8b.

The fuel can be any appropriate fuel, such as coal, oil, gas fuel, etc.; the oxidizer (usually pre-heated oxidizer) can be air, but other oxidizers are possible such as oxygen enriched air or substantially pure oxygen or other appropriate oxidizers; the HT solids can be alumina ($Al_2O_3$), but also other solid particles can be used which remain inert in the combustion system up to 1300° C., such as bauxite.

In addition, HT solids are larger than the sorbent particles applied for carbon capture. HT solids in the size range 800 μm-1.2 mm together with sorbent particles in the size range 50-500 μm would be desired, however other size classes may also function as long as the HT solids, which are more dense than the sorbent, are selected to be preferably larger than the sorbent particles applied. Alumina ($Al_2O_3$) is inert to the high temperature combustion environment of the furnace and does not take part in the combustion.

The circulation rate of HT solids is selected to moderate and as a means to control the combustion temperature in the furnace, the circulation rate is selected to avoid problems with melting components in the ash or sorbent residue which may enter the system. Bed ash produced during combustion in the furnace 2 can be extracted via a port 9.

The flue gas discharge 7 is connected to a carbonator 10, which can also have a flue gas supply 11 from a power plant or industrial process 12, and a carbon dioxide lean sorbent supply 13, for supplying a sorbent. Different types of sorbents are known in the art; for example the carbon dioxide lean sorbent can be calcium oxide CaO, but also other sorbents (natural or synthetic) can be used.

The carbonator 10 is also provided with a carbon dioxide rich sorbent discharge 15, containing calcium carbonate $CaCO_3$, and a carbon dioxide lean flue gas discharge 16.

The furnace 2 comprises a transfer system 50 for transferring the HT solids from the furnace 2 to the reactor 3.

Together with the HT solids, also the carbon dioxide rich sorbent (containing $CaCO_3$) is supplied into the reactor 3. In case the spent sorbent from the calciner is used for cement production raw meal may also be supplied into the reactor 3 to lower the carbon content of the feed material to the downstream kiln.

In the reactor 3 the calcination process takes place and calcined material (carbon dioxide lean sorbent and carbon dioxide) and HT solids are discharged therefrom.

The reactor 3 is connected with a classifier 18 and a separator 19, for classifying the HT solids from the carbon dioxide lean sorbent (at the classifier 18) and for separating the carbon dioxide lean sorbent from the carbon dioxide (at the separator 19).

The reactor 3 comprises a rotatable container 51 activated by a motor 51a with at least an inlet 20 for the HT solids and/or carbon dioxide rich solid sorbent that is advantageously fine grained (and/or when needed also raw meal for cement production), and at least an outlet 21 for carbon dioxide and/or a carbon dioxide lean solid sorbent and/or HT solids and/or calcined raw meal for cement production (when needed).

In a preferred embodiment, the container 51 has one opening as an inlet for the HT solids and carbon dioxide rich solid sorbent (and preferably also for raw meal in case the calciner is used together with a kiln for cement production), and one opening as an outlet for the carbon dioxide and carbon dioxide lean solid sorbent and HT solids (and preferably also for calcined raw mill in case the calciner is used for cement production).

In different examples the openings defining the inlet and/or outlet can also be more than one; in addition when more opening are provided as inlet and/or outlet, each opening can be used as an inlet and/or outlet for one or more of the materials (HT solids, carbon dioxide rich solid sorbent, raw mill (when needed), carbon dioxide lean solid sorbent), carbon dioxide.

Preferably, the rotatable container 51 has an elongated shape, such as a cylindrical shape, with a rotational axis 24, defining an angle A with an horizontal axis 25; the angle A is greater than 0 and it is selected such that is allows a slow movement of the material from the inlet 20 to the outlet 21 and thus a pre-defined residence time of the material within the container 51.

The elongated rotatable container has the inlet 20 and outlet 21 at opposite ends thereof. The inlet 20 is higher (i.e. it has higher elevation) than the outlet 21, this allows advancement of the material by gravity from the inlet 20 to the outlet 21.

In addition, the container 51 can be provided with one or more walls 26 extending from an internal surface thereof, to promote and improve mixing of the HT solids with the carbon dioxide rich solid sorbent. The walls 26 preferably allow entrainment of the small size material (sorbent, HT solids, raw meal if present), increase mixing and promote heat transfer.

The container 51 can be housed in a chamber 52, which preferably contains carbon dioxide. The chamber 52 is connected at one side to a transfer section 40 and at the other section to the classifier 18, to prevent carbon dioxide contamination with air. The container 51 and the connection points to the transfer section 40 and classifier 18 can be housed in the chamber 52 containing carbon dioxide at slight over pressure; this avoids air ingress and allows discharge of substantially pure carbon dioxide from the container 51. For this reason sucking means can be provided at the transfer section 40 to remove air preventing it for reaching the container 51.

The oxidizer supply 5 of the furnace 2 comprises a wind box 27 provided at the bottom of the furnace 2. The wind box 27 has an oxidizer distribution grid 28 (such as for example a perforated wall) delimiting the bottom of the furnace 2 for oxidiser admission into the furnace 2; the oxidizer is supplied into the wind box 27 or, if oxidizer is also supplied directly into the furnace, additional oxidizer is supplied into the furnace 2 via the wind box 27.

The transfer system 50 comprises at least one classifier 29 for separating the HT solids from other material contained in the furnace 2 and transferring the HT solids from the furnace 2 to the reactor 3.

The classifier 29 is preferably integrated into the wind box 27 and can comprise a duct 30 that opens into the furnace 2 and has one or more gas entrances 31, for gas admission into it. The gas entrances 31 are defined by holes in the duct. The holes are preferably uniformly distributed around the duct and allow uniform pressure and gas admission into the duct 30.

The duct 30 is partly housed in the wind box with both ends protruding from the wind box 27; the holes defining the gas entrances 31 are provided in a part of the duct 30 housed within the wind box 27, such that the oxidizer enters the duct 30 through them with a uniform pressure.

A certain mass flow of oxidizer must be supplied into the wind box 27, to ensure proper classification of bed ash and residue from the furnace. In addition, the duct's cross section 32 facing the furnace 2 is larger than the duct's cross section 33 opposite the furnace 2; this allows a better control of the HT solids flow through the duct 30, because the HT solids cannot freely fall through the duct 30 and build a standing column of particles.

In an embodiment, the transfer system 50 also comprises a bypass 35 in parallel with the classifier 29. The bypass 35 can be used for regulation of the HT solids flow in a broad range. The solids bypass 35 and classification system 29 may also be conceived to accept solids from a location on the side of the combustion device a certain height from the oxidizer distribution grid.

The bypass 35 can be actively controlled, for regulating the amount of HT solids passing through it. The actively controlled bypass can be realised with a cone valve 36 recognisable to someone skilled in the art, the cone valve would be implemented with a means to classify the passing material to avoid that unwanted ash is allowed to enter the reactor 3.

It is clear that in different embodiments of the calciner, the transfer system 50 can include the classifier 29 and/or the bypass 35 and/or the cone valve 36 and/or also other components.

The calciner 1 can also comprise the transfer section 40 between the classifier 29 and/or the bypass 35 and the inlet 20 of the rotatable container 51. For example, in case only the classifier 29 is provided, the transfer section 40 is provided between this classifier 29 and the inlet 20 of the rotatable container 51, when both the classifier 29 and the bypass 35 are provided, the transfer section 40 is provided between both the classifier 29 and bypass 35 and the inlet 20 of the rotatable container 51, when only the bypass 35 is provided (but this is not a preferred embodiment) the transfer section 40 is provided between the bypass 35 and the inlet 20 of the rotatable container 51.

The transfer section 40 comprises a chute 41 for transferring the HT solids, possibly together with the carbon dioxide rich solid sorbent, to the inlet 20 of the rotatable container. Naturally according to the particular design, one or more chutes can be provided for the HT solids and one or more chutes can be provided for the carbon dioxide rich solid sorbent; it is also possible that one or more chutes transfer both HT solids and carbon dioxide rich solid sorbent. Other means for transferring the HT solids and/or the carbon dioxide rich solid sorbent are anyhow possible. In addition, when also raw meal is supplied into the container 51 for cement production, the chute 41 can transfer also this raw meal; also in this case a separate chute can be provided to transfer the raw meal or in any case, additional fluid flow (possibly oxidizer or $CO_2$) may be used to ensure solids movement.

The transfer section 40 is advantageously closed, to prevent dust or other material from flowing around in the atmosphere.

At the outlet 21 of the rotatable container 51, the calciner has the classifier 18 and separator 19.

The classifier 18 comprises a solid particle classifier; the HT solids and carbon dioxide lean solid sorbent are exposed to a fluid flow of carbon dioxide for separation of the HT solids from the carbon dioxide lean solid sorbent by gravity against a carbon dioxide flow. The HT solids that are discharged from the classifier 18 are supplied back into the furnace 2 via 8a or 8b.

The carbon dioxide and carbon dioxide lean solid sorbent from the classifier 18 are supplied into the second separator 19 such as a cyclone, where the carbon dioxide lean solid sorbent is separated from the carbon dioxide; thus substantially pure carbon dioxide is discharged from the separator 19 and forwarded to further treatment (for example, washing, cooling, compression and sequestration) and carbon dioxide lean solid sorbent is discharged from the separator 19 and supplied back into the carbonator 10.

Figure 4:
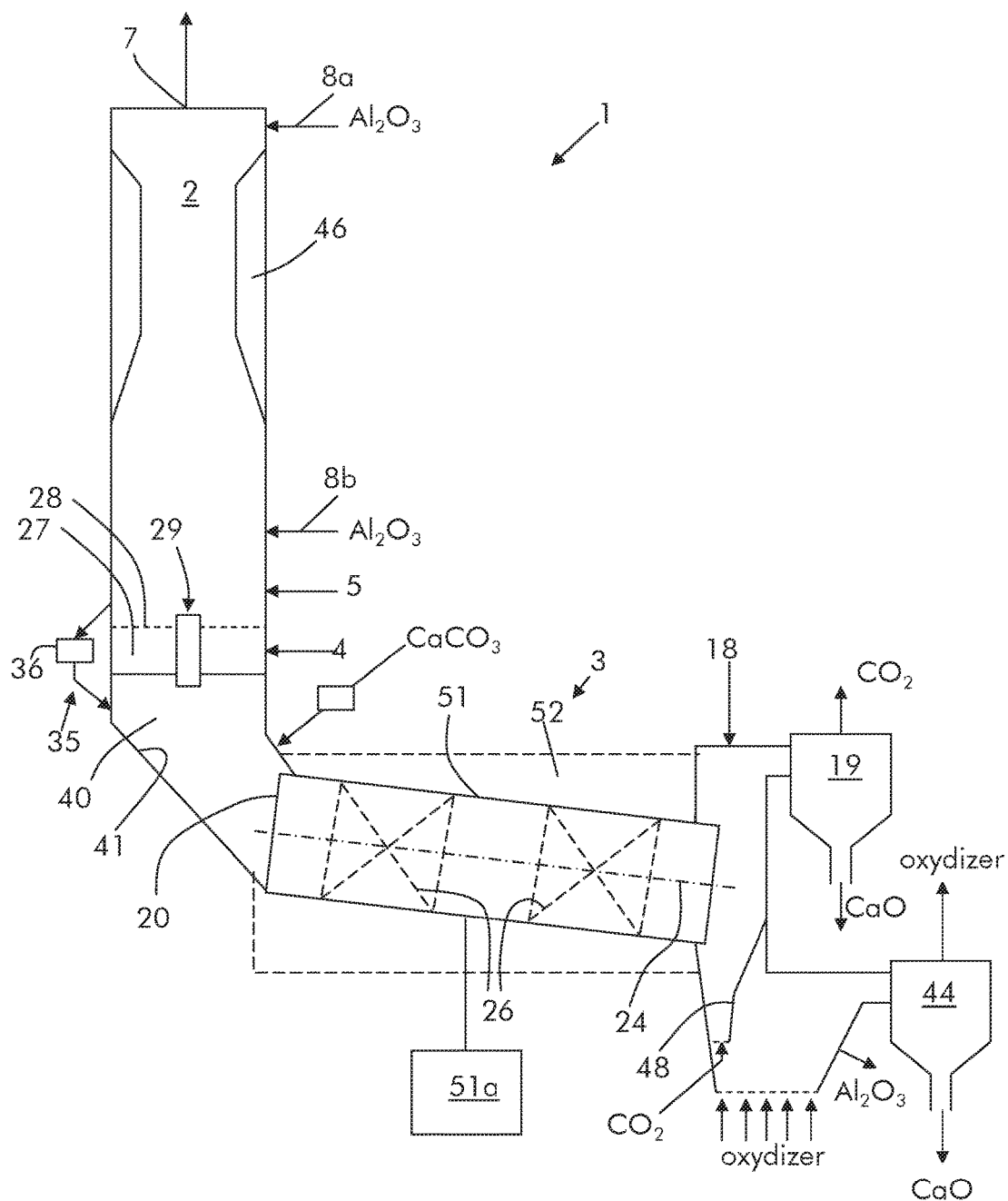
FIG. 4 shows a different embodiment of the calciner.

With reference to FIG. 4 an alternative way of separating the HT solids from the carbon dioxide lean solid sorbent is described.

HT solids leaving the container 51 and falling to the bottom of the classifier 18 enter a sealing device 48 (such as a loop seal) which is feed with $CO_2$ stream to ensure air does not pass the sealing device 48 contaminating the $CO_2$ product. In addition, the classifier 18 is supplied with the oxidizer for separation of the HT solids from the remaining carbon dioxide lean solid sorbent. The oxidizer together with entrained carbon dioxide lean solid sorbent is forwarded to a separator 44, where the oxidizer is separated from the carbon dioxide lean solid sorbent and supplied for example into the furnace 2 or boiler or industrial process to burn fuel, and the carbon dioxide lean solid sorbent is forwarded to the carbonator 10 for $CO_2$ capture. Some of the carbon dioxide lean solid sorbent will be entrained in the carbon dioxide stream and is forwarded to the separator 19 (such as a cyclone) where the carbon dioxide is separated and forwarded for possible further treatment, such as sequestration; the carbon dioxide lean solid sorbent is forwarded to the carbonator 10.

The furnace 2 can have a deflector or internal walls 46 for increasing the heat exchange between the raising flue gas and the falling HT solids supplied via the supply 8a.

In addition, the HT solids supply 8a, 8b can comprise one or more supply; for example, FIGS. 1 and 4 show a first supply 8a and a second supply 8b; the first supply 8a is at the upper part of the furnace 2 (preferably above the deflector 46) and the second supply 8b is at the lower part of the furnace 2.

The operation of the calciner is apparent from that described and illustrated and is substantially the following.

Fuel and oxidizer (air) are supplied into the furnace 2 via the fuel supply 6 and wind box 27. In addition, also HT solids are supplied into the furnace 2, preferably from both the HT solids supplies 8a and 8b. The HT solids contained in the furnace 2 are heated by the combustion of the fuel.

Advantageously the largest portion of HT solids is supplied via the HT solids supply 8b at the lower part of the furnace 2 and a smaller part of HT solids is supplied via the HT solids supply 8a at the upper part of the furnace 2. This way, the HT solids supplied via the supply 8b are heated to a temperature between 1100-1300° C. and the HT solids supplied via the supply 8a are heated to about 900° C.; the flue gas can thus be cooled to very close to the calcination temperature (about 900° C.) while only a portion (e.g. about half) of the HT solids has to be brought to the supply 8a at high elevation.

The heated HT solids (at a temperature between 1100-1300° C.) enter the duct 30 and pass through it (their flow is regulated by the pressure difference over the device and influenced in part by the oxidizer pressure in the wind box 27); the HT solids are then discharged to the chute 41. In addition, the HT solids also enter the bypass 35 are discharged on the chute 41 bypassing the classifier 29. The bypass 35 is used to improve control of the amount of HT solids supplied from the furnace 2 to the reactor 3, for example when the classifier 29 is not capable of a flexible control of the amount of HT solids passing.

In addition, also carbon dioxide rich solid sorbent is supplied on the chute 41 to the rotating calcination reactor but it can also be supplied via a separate chute or in a different way.

In case of cement production, raw meal is also supplied on the chute 41.

The heated HT solids and the carbon dioxide rich solid sorbent (possibly with raw meal) enter the rotatable container 51 via the inlet 20 and are intimately mixed by the rotation of the reactor 3.

Efficient mixing occurs without the need of supplying any fluidizing medium (such as steam or carbon dioxide) but primarily by way of the rotation of the rotatable container 51 and thanks to the walls 26. The rotation together with the advancing movement from the inlet 20 to the outlet 21 (advancing takes place due to the wall 26 and/or the inclination) allow a good mixing of and heat transfer from the HT solids to the carbon dioxide rich solid sorbent. Since the HT solids entering have a temperature around 1200° C. and rich sorbent has a temperature around 800° C. (after sorbent heating in the solids-solids heat exchanger 60) an intense heat transfer between the particles occurs.

The rapid heating of the carbon dioxide rich solid sorbent causes the calcination reaction:

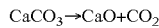

$$CaCO_3 \rightarrow CaO+CO_2$$

that occurs when the carbon dioxide rich solid sorbent reaches a temperature above that associated with the calcination temperature dependent on the local partial pressure of $CO_2$, around 900° C. for 1 bar $CO_2$ partial pressure. Since the calcination reaction is strongly endothermic the temperature of the reacting particles is regulated at the entrance of 51 even though the temperature differences are high.

When discharged from the outlet 21 of the rotatable container 51, the HT solids are classified in 18 from the sorbent particles by differences in particle size and particle density both acting to aid the classification process. The classification can occur by using $CO_2$ or some other medium (for example air or oxidizer). After classification carbon dioxide and lean solid sorbent are separated in 19. In the case that some other medium is used for the classification such as air and additional separation device is required such as 44.

The present invention also refers to a method for calcining a carbon dioxide rich sorbent.

The method comprises:
combusting in the furnace 2 the fuel with the oxidizer,
supplying the HT solids into the furnace 2 and heating them,
extracting, transferring and controlling the flow of HT solids from the furnace 2 to the calcination reactor 3, preferably while ensuring the removal of fly ash from the HT solids via provided classification devices,
supplying the carbon dioxide rich solid sorbent such as $CaCO_3$ into the rotatable reactor 3,
rotating the rotatable container 51 for mixing the HT solids and the carbon dioxide rich solid such as $CaCO_3$, for transferring heat from the HT solids to the carbon dioxide rich solid sorbent such as $CaCO_3$ and generating carbon dioxide $CO_2$ and carbon dioxide lean solid sorbent such as CaO,
discharging the carbon dioxide $CO_2$ and the carbon dioxide lean solid sorbent such as CaO from the rotatable container.

The method can also include classification of HT solids and lean sorbent, while allowing contamination free separation of $CO_2$.

Naturally the features described may be independently provided from one another.

In practice the materials used and the dimensions can be chosen at will according to requirements and to the state of the art.

The invention claimed is:

1. A method for calcination of a carbon dioxide rich sorbent, the method comprising:
combusting a fuel with an oxidizer in a furnace;
providing a heat transfer (HT) solid particle supply into the furnace and heating the HT solids;
transferring the HT solids from the furnace to a reactor having a rotatable container;
supplying a carbon dioxide rich solid sorbent into the rotatable container;
mixing the HT solids and the carbon dioxide rich solid sorbent in the rotatable container to generate a carbon dioxide gas stream and a carbon dioxide lean solid sorbent, and
discharging the carbon dioxide gas stream and the carbon dioxide lean solid sorbent from the rotatable container.

2. The method according to claim 1, further comprising:
providing the carbon dioxide lean solid sorbent and the carbon dioxide gas stream from the rotatable container to a classifier; and
separating the HT solids from the carbon dioxide lean solid sorbent.

3. The method according to claim 2, further comprising:
providing the carbon dioxide lean solid sorbent and the carbon dioxide gas stream from the classifier to a separator; and
separating the carbon dioxide gas stream from the carbon dioxide lean solid sorbent.

4. The method according to claim 3, further comprising forwarding the carbon dioxide lean solid sorbent from the separator to the rotatable container.

5. The method according to claim 3, further comprising forwarding the carbon dioxide gas stream to the classifier.

6. The method according to claim 1, wherein the rotatable container comprises at least one inlet and at least one outlet and comprises an elongated shape with a rotational axis, the rotational axis defining an angle A with a horizontal axis greater than 0 so that the inlet is higher than the outlet.

7. The method according to claim 1, further comprising:
providing at least a first portion of the HT solids particle supply to the furnace at a first location; and providing at least a second portion of the HT solids particle supply to the furnace at a second location, the second location being higher in elevation than the first location.

8. The method according to claim 7 wherein the HT particles supplied to the first location are heated to a temperature between 1100-1300° C. in the furnace.

9. The method according to claim 7 wherein the HT particles supplied to the second location are heated to a temperature about 900° C. in the furnace.

10. The method according to claim 1, further comprising:
providing at least a first portion of the HT solids particle supply to the lower part of the furnace; and
providing at least a second portion of the HT solids particle supply to the upper part of the furnace.

11. The method according to claim 10 wherein the HT particles supplied to the lower part of the furnace are heated to a temperature between 1100-1300° C. in the furnace.

12. The method according to claim 10 wherein the HT particles supplied to the upper part of the furnace are heated to a temperature about 900° C. in the furnace.

13. A method for calcination of a carbon dioxide rich sorbent, the method comprising:
providing at least a first portion of heat transfer (HT) solid particles to a furnace at a first location;
providing a carbon dioxide rich sorbent to the furnace at the first location;
heating the HT solid particles and the carbon dioxide rich sorbent in the furnace;
transferring the heated HT solid particles and the heated carbon dioxide rich sorbent from the furnace to a reactor having a rotatable container;
mixing the HT solids and the carbon dioxide rich solid sorbent in the rotatable container to provide a carbon dioxide gas stream and a carbon dioxide lean solid sorbent.

14. The method according to claim 13, further comprising:
providing the carbon dioxide lean solid sorbent and the carbon dioxide gas stream from the rotatable container to a classifier; and
separating the HT solids from the carbon dioxide lean solid sorbent.

15. The method according to claim 14, further comprising:
providing the carbon dioxide lean solid sorbent and the carbon dioxide gas stream from the classifier to a separator; and
separating the carbon dioxide gas stream from the carbon dioxide lean solid sorbent.

16. The method according to claim 15, further comprising forwarding the carbon dioxide lean solid sorbent from the separator to the rotatable container.

17. The method according to claim 15, further comprising forwarding the carbon dioxide gas stream from the separator to the classifier.

* * * * *